United States Patent [19]
Parent

[11] Patent Number: 5,765,851
[45] Date of Patent: Jun. 16, 1998

[54] SELF-ALIGNING TOWING APPARATUS

[75] Inventor: Richard A. Parent, Sherwood Park, Canada

[73] Assignee: Dethmers Manufacturing Company, Inc., Boyden, Iowa

[21] Appl. No.: 604,379

[22] Filed: Feb. 21, 1996

Related U.S. Application Data

[63] Continuation of Ser. No. 285,224, Aug. 3, 1994, abandoned.

[51] Int. Cl.⁶ .................................................. B60D 1/54
[52] U.S. Cl. ............................. 280/491.4; 280/491.1; 280/493
[58] Field of Search ...................... 280/406.1, 456.1, 280/462, 467, 488, 489, 491.1, 491.3, 491.4, 494, 492, 493, 507

[56] References Cited

U.S. PATENT DOCUMENTS

| | | | |
|---|---|---|---|
| 1,229,465 | 6/1917 | Hudson | 280/492 |
| 1,422,129 | 7/1922 | Reuse | 280/491.1 |
| 1,557,841 | 10/1925 | Holmes . | |
| 1,730,077 | 10/1929 | Isachsen . | |
| 2,027,499 | 1/1936 | Tully | 280/492 |
| 2,120,422 | 6/1938 | Williams et al. | 280/33.44 |
| 2,133,065 | 10/1938 | Weber | 280/93.15 |
| 2,139,970 | 12/1938 | Moore . | |
| 2,457,885 | 1/1949 | Gatch | 280/492 |
| 2,664,300 | 12/1953 | Danielson et al. | 280/486 |
| 2,746,771 | 5/1956 | Gross . | |
| 2,795,435 | 6/1957 | Oritz | 280/493 |
| 2,871,030 | 1/1959 | Hollis . | |
| 3,019,033 | 1/1962 | Wegener | 280/493 |
| 3,281,162 | 10/1966 | Carson . | |
| 3,384,391 | 5/1968 | Batke . | |
| 3,492,022 | 1/1970 | Hansen . | |
| 3,572,765 | 3/1971 | Tieben | 280/491 |
| 3,649,048 | 3/1972 | Garnett | 280/477 |
| 3,679,231 | 7/1972 | Derr, Jr. . | |
| 3,730,557 | 5/1973 | Cox | 280/504 |
| 3,740,074 | 6/1973 | Coil | 280/402 |
| 3,794,355 | 2/1974 | Cracolice | 280/482 |
| 3,806,162 | 4/1974 | Milner | 280/502 |

(List continued on next page.)

FOREIGN PATENT DOCUMENTS

| | | | |
|---|---|---|---|
| 844457 | 7/1970 | Canada | 280/42 |
| 1171112 | 7/1974 | Canada | 280/141 |
| 153309 | 1/1952 | Sweden . | |
| 269114 | 1/1971 | U.S.S.R. | 280/491.4 |
| 725339 | 3/1955 | United Kingdom . | |

*Primary Examiner*—Anne Marie Boehler
*Attorney, Agent, or Firm*—Brian J. Laurenzo; Michael C. Gilchrist

[57] ABSTRACT

A storable self-aligning towing assembly which allows universal pivoting about three axes between a towing vehicle and a towed vehicle. The towing assembly is self-supporting. A hitching member is releasably attached to a towing vehicle at a first end of the hitching member; a first yoke member is pivotally attached to a second end of the hitching member such that the first yoke member pivots about a first axis which is generally horizontal and is normal an extended longitudinal axis of the hitching member; a second yoke member is connected to the first yoke member such that the second yoke member is free to rotate with respect to the first yoke member about an axis that is generally parallel to an extended longitudinal axis of the hitching member; a towed vehicle attachment means is releasably attached at a first end to a towed vehicle; the towed vehicle attachment means is pivotally attached to the second yoke member such that the second yoke member pivots with respect to the towed vehicle attachment means about a second axis which is generally vertical and is normal to the extended longitudinal axis of the hitching member. The configuration allows the towing assembly to pivot from a towing position to a storage position on the rear of the towing vehicle. A latching mechanism secures the self-aligning towing assembly in the storage position on the rear of the towing vehicle. The self-aligning towing assembly may be further converted into a shipping position.

33 Claims, 6 Drawing Sheets

U.S. PATENT DOCUMENTS

| | | | |
|---|---|---|---|
| 3,829,131 | 8/1974 | Moore | 280/491.1 |
| 3,843,164 | 10/1974 | Flegel | 280/492 |
| 3,848,890 | 11/1974 | Macalpine | 280/494 |
| 3,938,830 | 2/1976 | Lane | 280/493 |
| 3,947,062 | 3/1976 | Pierce | 280/505 |
| 3,998,471 | 12/1976 | Lutchemeier | 280/492 |
| 4,073,508 | 2/1978 | George et al. | 280/478 |
| 4,200,306 | 4/1980 | Helms | 280/494 |
| 4,326,730 | 4/1982 | Tomen | 280/502 |
| 4,548,423 | 10/1985 | Craven | 280/492 |
| 4,588,199 | 5/1986 | Fisher | 280/292 |
| 4,603,874 | 8/1986 | Merrill | 280/402 |
| 4,640,523 | 2/1987 | Wolmarans | 280/495 |
| 4,711,461 | 12/1987 | Fromberg | 280/494 |
| 4,714,264 | 12/1987 | Woestelandt | 280/456 |
| 4,727,949 | 3/1988 | Rea et al. | 280/493 |
| 4,768,803 | 9/1988 | Hewitt et al. | 280/462 |
| 4,856,805 | 8/1989 | Davis | 280/491.4 |
| 4,861,061 | 8/1989 | Frantz | 280/479 |
| 4,869,521 | 9/1989 | Johnson | 280/491.1 |
| 5,000,473 | 3/1991 | Johnson | 280/491.1 |
| 5,071,153 | 12/1991 | Duncan | 280/491.4 |
| 5,088,754 | 2/1992 | Skelton | 280/491.1 |
| 5,186,483 | 2/1993 | Sheppard | 280/494 |
| 5,224,960 | 7/1993 | Duncan | 280/491.4 |
| 5,232,240 | 8/1993 | Johnson | 280/491.5 |
| 5,308,100 | 5/1994 | Heider | 280/491.1 |
| 5,316,330 | 5/1994 | Bergeron | 280/477 |
| 5,346,243 | 9/1994 | Boeck | 280/491.1 |

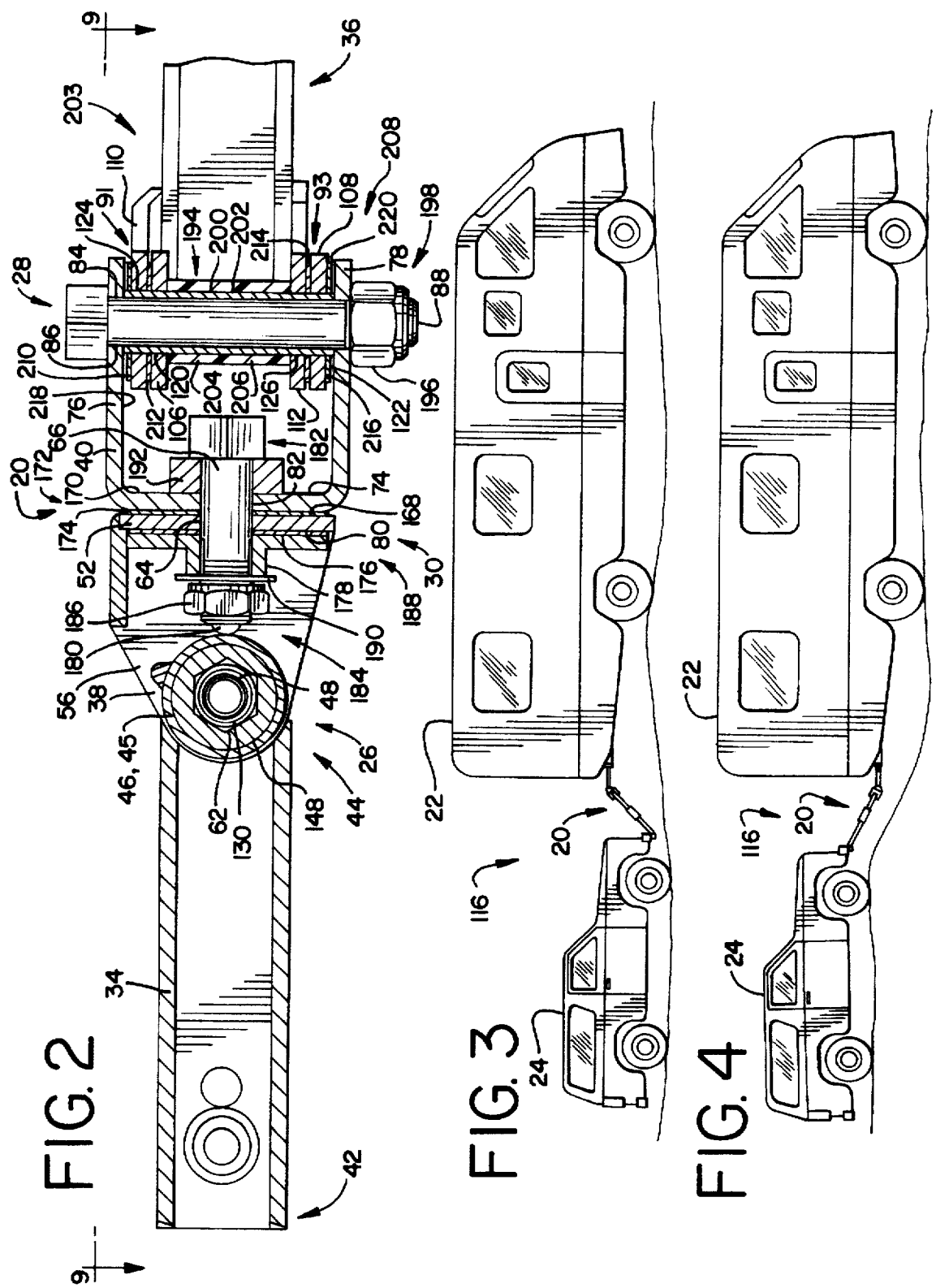

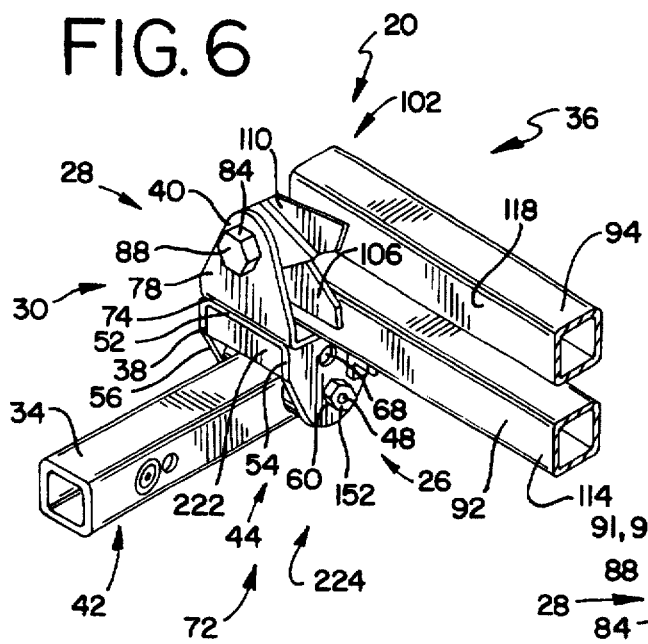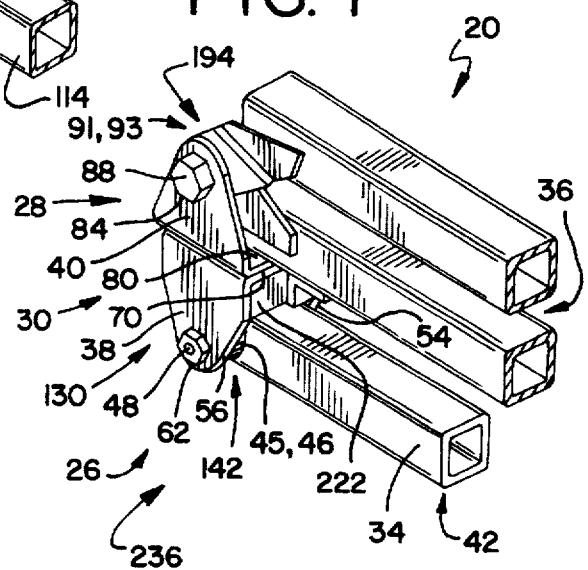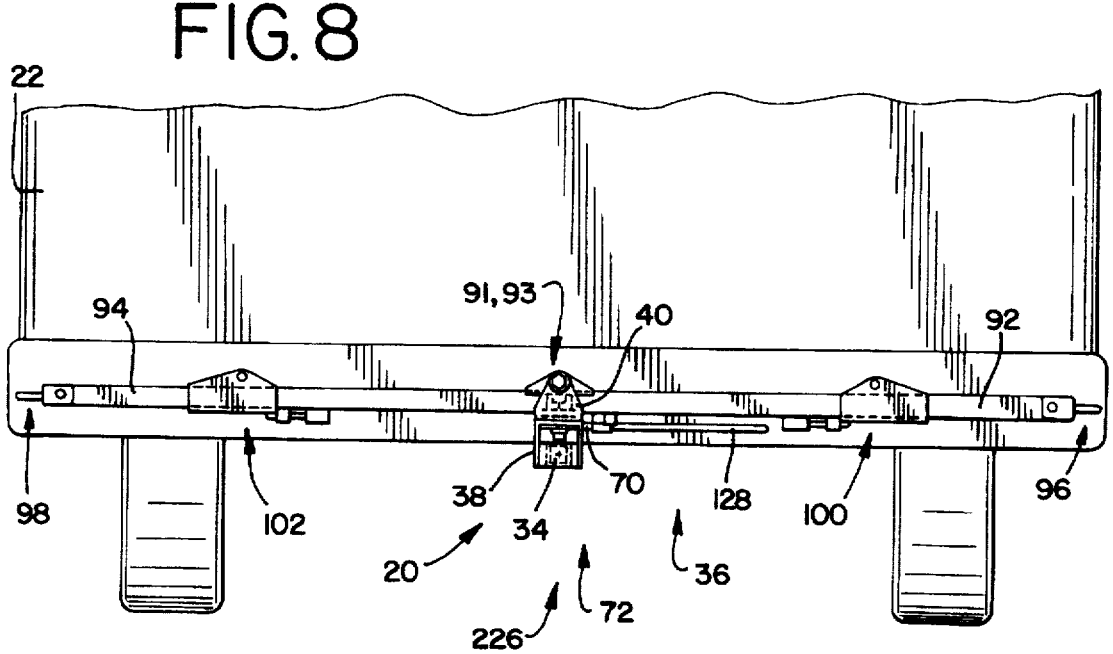

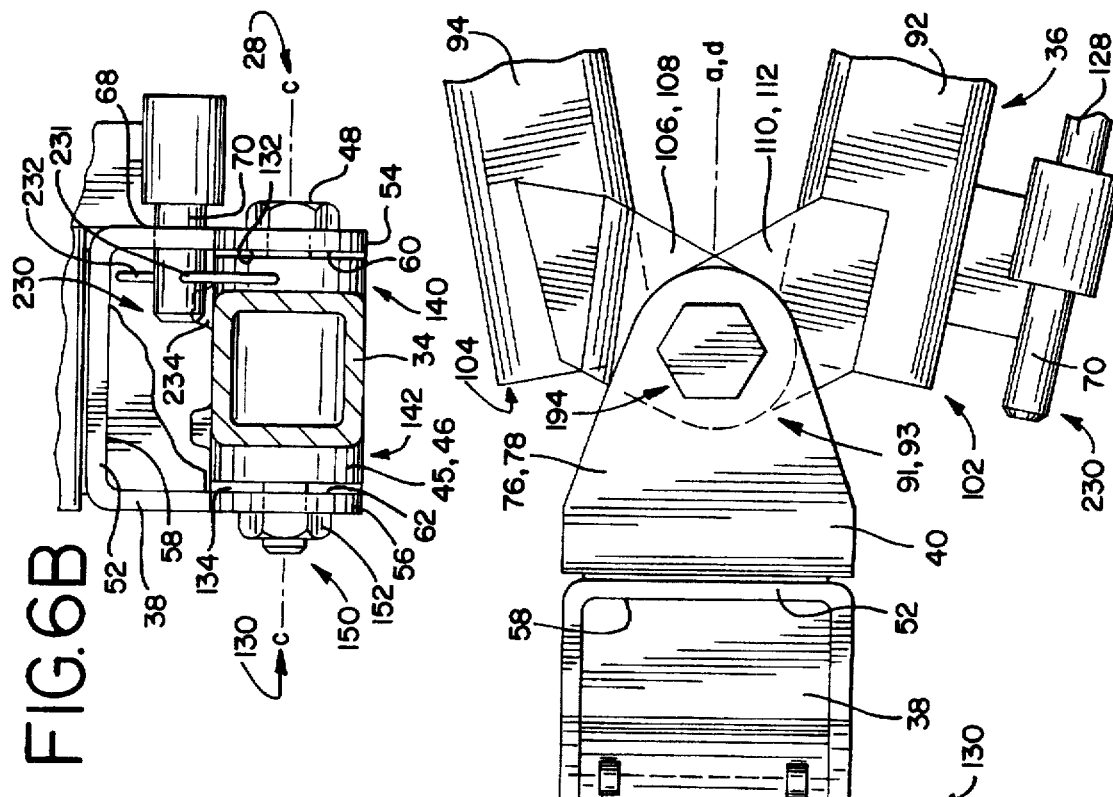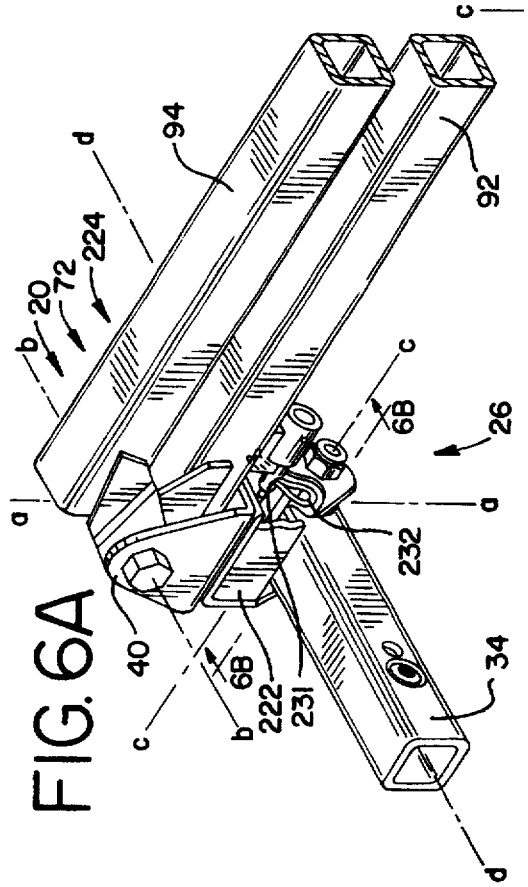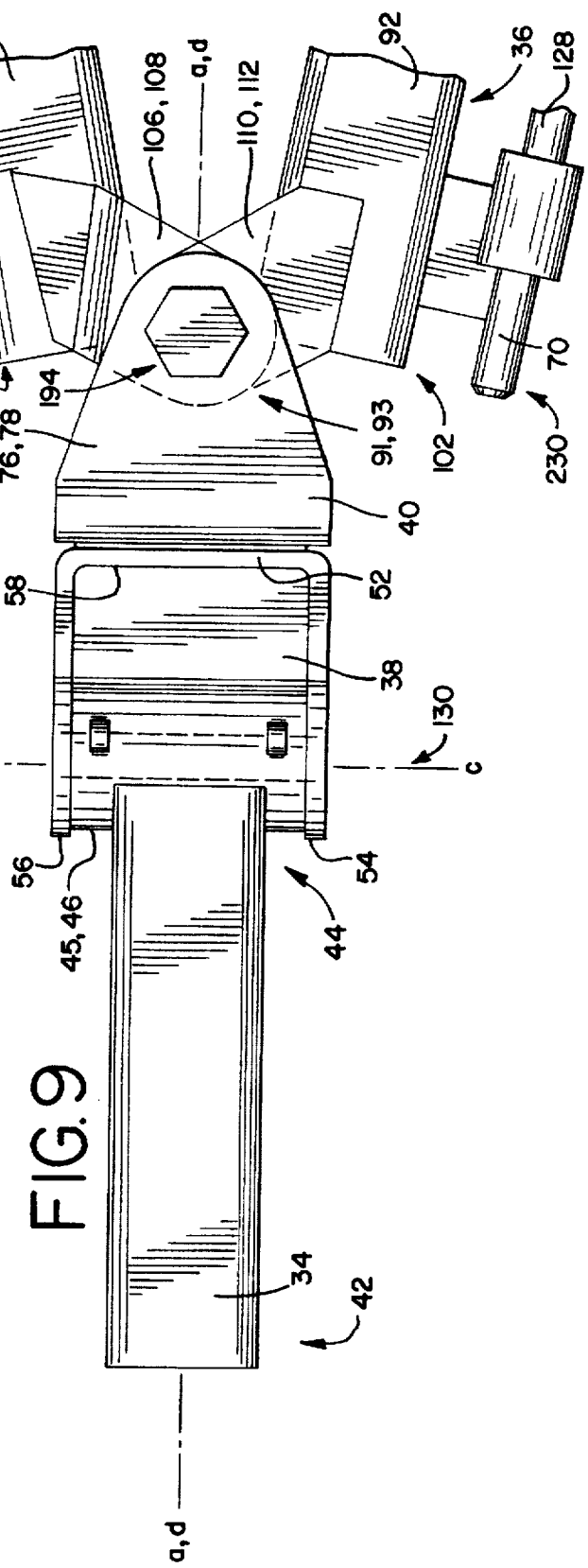

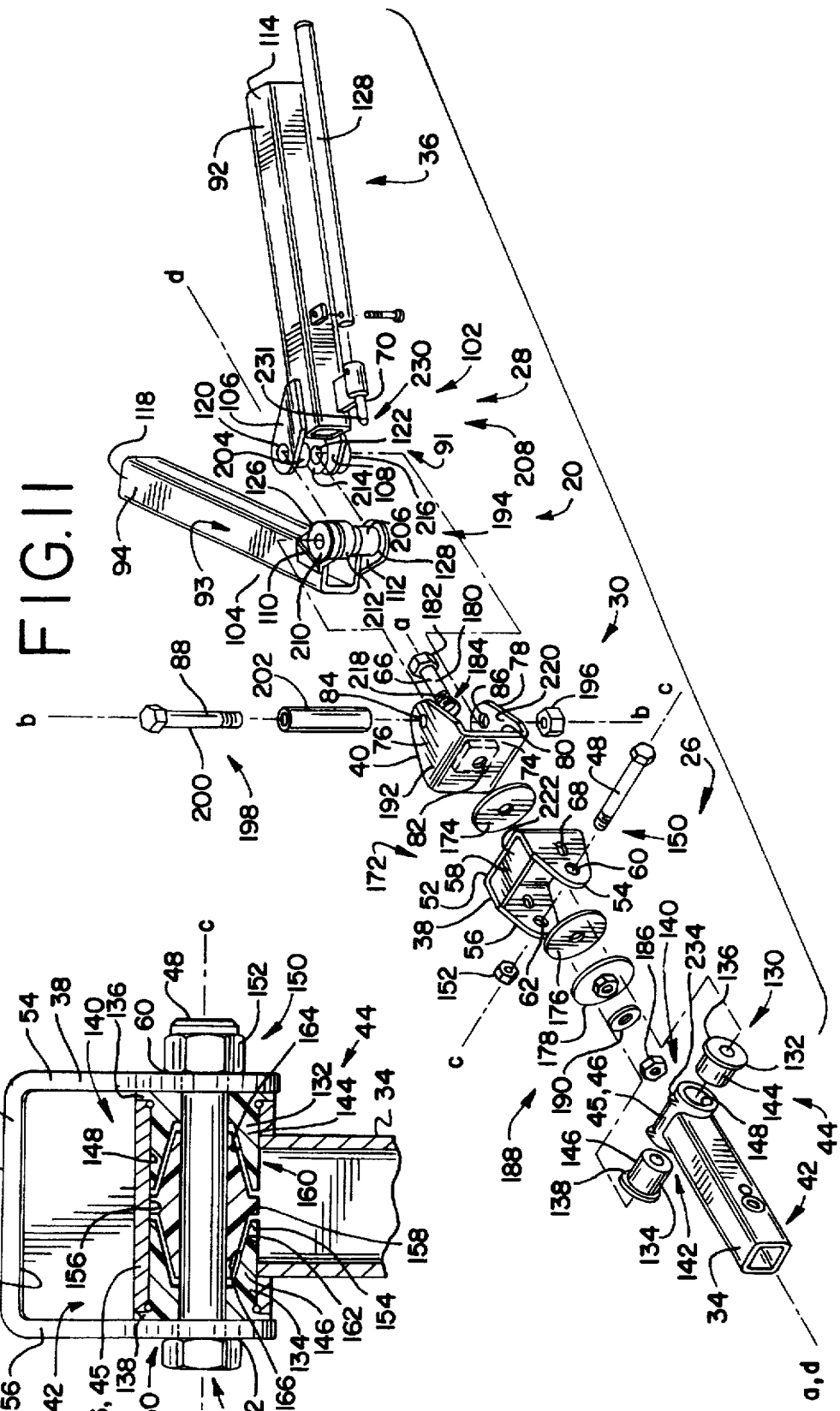

SELF-ALIGNING TOWING APPARATUS

This application is a continuation of application Ser. No. 08/285,224 filed Aug. 3, 1994, now abandoned.

BACKGROUND OF THE INVENTION

The present invention relates generally to releasably attachable self-aligning towing assemblies, and specifically to a self-aligning towing assembly which is universally pivotal and which folds-up for convenient storage on and off a towing vehicle.

Towing assemblies are used in a variety of situations where a towing vehicle pulls a towed vehicle behind it. When the vehicles travel over uneven ground the towed vehicle often becomes disoriented with respect to the towing vehicle about an up-and-down pivot axis, a roll axis, and a side-to-side pivot axis. It is therefore desirable to have a towing assembly which allows pivoting about these three axes.

When the towed vehicle attachment means is disengaged from the towed vehicle, it is unsupported by outside agents. If the towing assembly is not self-supporting, the user of the towing assembly will be required to support the weight of the towed vehicle attachment means during attachment to and disconnection from the towed vehicle. For this reason, it is desirable that the towing assembly be self-supporting when it is not attached to the towed vehicle.

When the towed vehicle is uncoupled from the towing vehicle, the tow bar assembly must be stored, either on one of the vehicles or off of the vehicles. It is known to store the tow bar assembly on the towing vehicle and on the towed vehicle. Storing the tow bar assembly on the towed vehicle can be less desirable than on the towing vehicle, due to the unaesthetic and sometimes vision obstructing effect of having a tow bar assembly on the front of the towed vehicle. For this reason, it is preferred that the tow bar assembly be suited for storage on the towing vehicle. Because different vehicles have license plates and spare tires in different locations, it is also desirable that tow bar assemblies which store on the rear of the towing vehicle be suited for storage in more than one configuration.

Many tow bars are used only occasionally, such as the person who uses a recreational vehicle to tow a car only when going on extended excursions. In this situation it is desirable to have a tow bar assembly that can be removed from the towing vehicle and stored in a small space. It is also desired that the towing assembly fold into a small configuration for shipping purposes.

When a towing load is applied to the towing assembly, the parts of the towing assembly can pull apart slightly, causing play among the parts of the assembly. When there is play in the assembly, the parts wear unevenly and at an increased rate. For this reason it is also desirable to provide a towing assembly that will not pull apart upon the application of a towing load.

U.S. Pat. No. 5,232,240 discloses a universally pivotal towing hitch that can further be adjusted into an on-the-towing-vehicle storage position. However, this towing hitch does not disclose its means for allowing relative roll between its means for allowing side-to-side pivoting and its means for allowing up-and-down pivoting. Because of this, the assembly is not self-supporting when the towed vehicle attachment means is folded proximate to the towing vehicle. Furthermore, the roll axis is still horizontal and the towed vehicle attachment means must be locked in place by means subjected to a shear force.

U.S. Pat. No. 5,186,483 discloses a towing coupling which comprises means for allowing relative roll located between means for allowing side-to-side pivoting and means for allowing up-and-down pivoting. However, this patent does not disclose means for pivoting the towing coupling into a storage position.

The difficulties in the prior art are substantially eliminated by the present invention.

SUMMARY OF THE INVENTION

Accordingly, it is an object of the present invention to provide a self-aligning towing assembly that allows universal pivoting between a towing vehicle and a towed vehicle.

It is a further object of the present invention to provide a self-supporting towing assembly.

It is another object of the present invention to provide a self-aligning towing assembly which has minimal play among the parts of the assembly when a towing load is applied.

It is a further object of the present invention to provide a self-aligning towing assembly that stores on the rear of a towing vehicle.

It is yet another object of the present invention to provide a self-aligning towing assembly that can be stored in more than one configuration.

It is another object of the present invention to provide a self-aligning towing assembly that folds into a compact configuration for shipping and off-vehicle storage.

It is a further object of the present invention to provide a self-aligning towing assembly that utilizes means for allowing relative roll between an up-and-down pivot and a side-to-side pivot in its connections to provide a tow bar assembly that will support itself in a storage position on the towing vehicle.

It is an additional object of the present invention to allow simple conversion among a towing position, an on towing vehicle storage position, and a shipping position.

By the present invention, it is proposed to overcome the difficulties encountered heretofore. To this end, a self-aligning towing assembly which allows universal pivoting about three axes and which folds for convenient storage on or off the towing vehicle is provided. The self-aligning towing assembly comprises a hitching member for releasable attachment to the towing vehicle, the hitching member has a first end for attachment to the towing vehicle and a second end opposite the first end; a towed vehicle attachment means having a first end for releasable attachment to a towed vehicle, and a second end opposite the first end; vertical pivot means for allowing changes in elevation between the towed vehicle relative to the towing vehicle, the vertical pivot means are attached to the second end of the hitching member; horizontal pivot means for allowing changes in lateral angular orientation of the towed vehicle relative to an extended longitudinal axis of the hitching means, the horizontal pivot means are attached to the second end of the towed vehicle attachment means; and swivel means located between and in connection with the vertical pivot means and the horizontal pivot means, the swivel means allow for roll between the towing vehicle and the toward vehicle with respect to the extended longitudinal axis of the hitching member, and the location of the swivel means between the horizontal pivot means and the vertical pivot means allows the self-aligning towing assembly to fold upon itself for storage.

BRIEF DESCRIPTION OF THE DRAWINGS

FIG. 2 is a cross-sectional side elevational view of the self-aligning towing assembly of FIG. 1;

FIG. 3 is a side elevational view of the self-aligning towing assembly of FIG. 1 shown attached between a towed vehicle and a towing vehicle, the towed vehicle shown at a lower elevation relative to the towing vehicle;

FIG. 4 is a side elevational view of the self-aligning towing assembly of FIG. 1 shown attached between a towed vehicle and a towing vehicle, the towed vehicle shown at a higher elevation relative to the towing vehicle;

FIG. 6 is a perspective view of the self-aligning towing assembly in a storage position;

FIG. 6A is a partial cross-sectional view of FIG. 6 in order to illustrate the latching mechanism of the present invention;

FIG. 6B is a sectional view taken along lines 6B—6B of FIG. 6A in order to further illustrate the latching mechanism of the present invention;

FIG. 7 is a perspective view of the self-aligning towing assembly in a shipping position;

FIG. 8 is a rear elevational view of the self-aligning towing assembly of the present invention assembly shown attached to the towing vehicle and in a spread storage position;

FIG. 9 is a cross-sectional plan view of the self-aligning towing assembly of FIG. 1;

FIG. 10 is a cross-sectional plan view of an alternative embodiment of the self-aligning towing assembly which uses a tapered annular bearing; and FIG. 11 is an assembly view of the self-aligning towing assembly of FIG. 1.

DETAILED DESCRIPTION OF THE INVENTION

Figure 5:
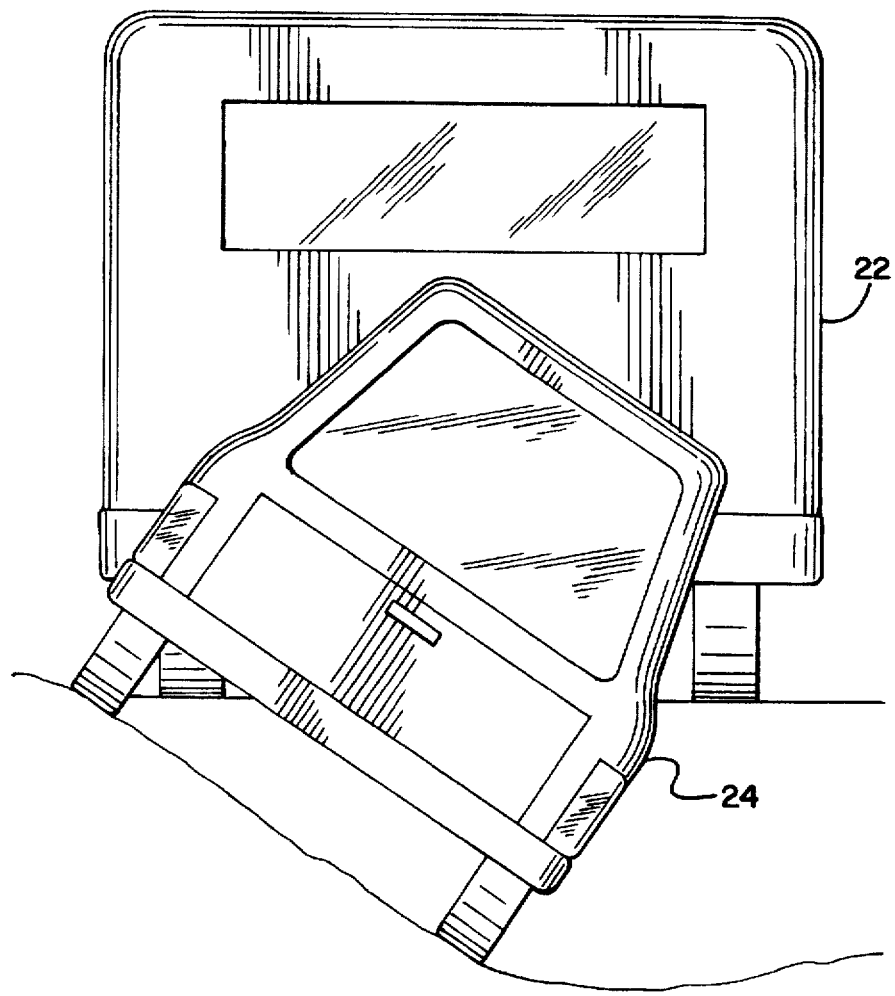
FIG. 5 is a rear elevational view showing roll between the towing vehicle and towed vehicle of FIG. 3.
Figure 5A:
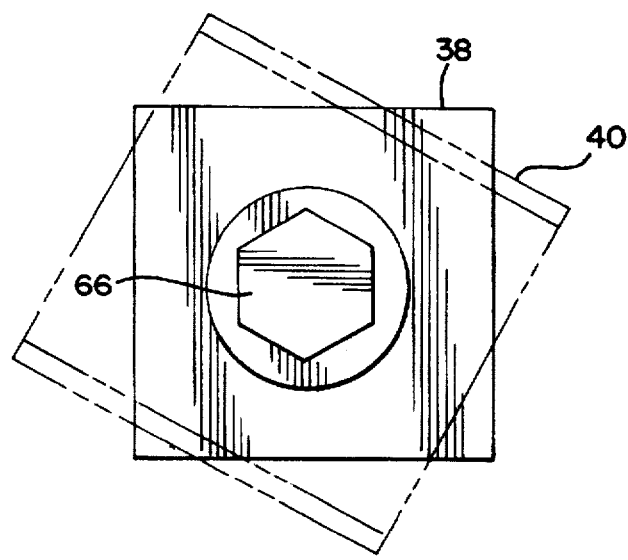
FIG. 5A is a schematic view showing the swivel means of the present invention oriented similar to FIG. 5.

The Figures show a self-aligning towing assembly 20 which allows universal pivoting about three axes between a towing vehicle 22 and a towed vehicle 24. The self-aligning towing assembly 20 folds for convenient storage on or off said towing vehicle 22 (see FIG. 6 & 8). The self-aligning towing assembly 20 has a vertical pivot means 26 for allowing changes in elevation of the towed vehicle 24 with respect to the towing vehicle 22 (see FIGS. 3 & 4), a horizontal pivot means 28 for allowing changes in lateral angular orientation of the towed vehicle 24 with respect to the towing vehicle 22, and swivel means 30 located between and in connection with the vertical pivot means 26 and the horizontal pivot means 28 to allow for roll of the towed vehicle 24 with respect to the towing vehicle 22 (see FIGS. 5 & 5A) about an extended longitudinal axis d—d of a hitching member. The intermediate location of the swivel means 30 allows the swivel axis to be positioned horizontally or vertically, which permits the self-aligning towing assembly 20 to be folded into a compact position.

The self-aligning towing assembly 20 has the hitching member 34 which is attachable to the towing vehicle 22 and a towed vehicle attachment means 36 which may be attached to the towed vehicle 24. As can be seen in the cross-sectional views in FIGS. 2 & 9, the vertical pivot means 26 is located between the hitching member 34 and the swivel means 30, and the horizontal pivot means 28 is located between the swivel means 30 and the towed vehicle attachment means 36. The swivel means 30 comprises a first yoke member 38 and a second yoke member 40 placed back-to-back.

Figure 1:
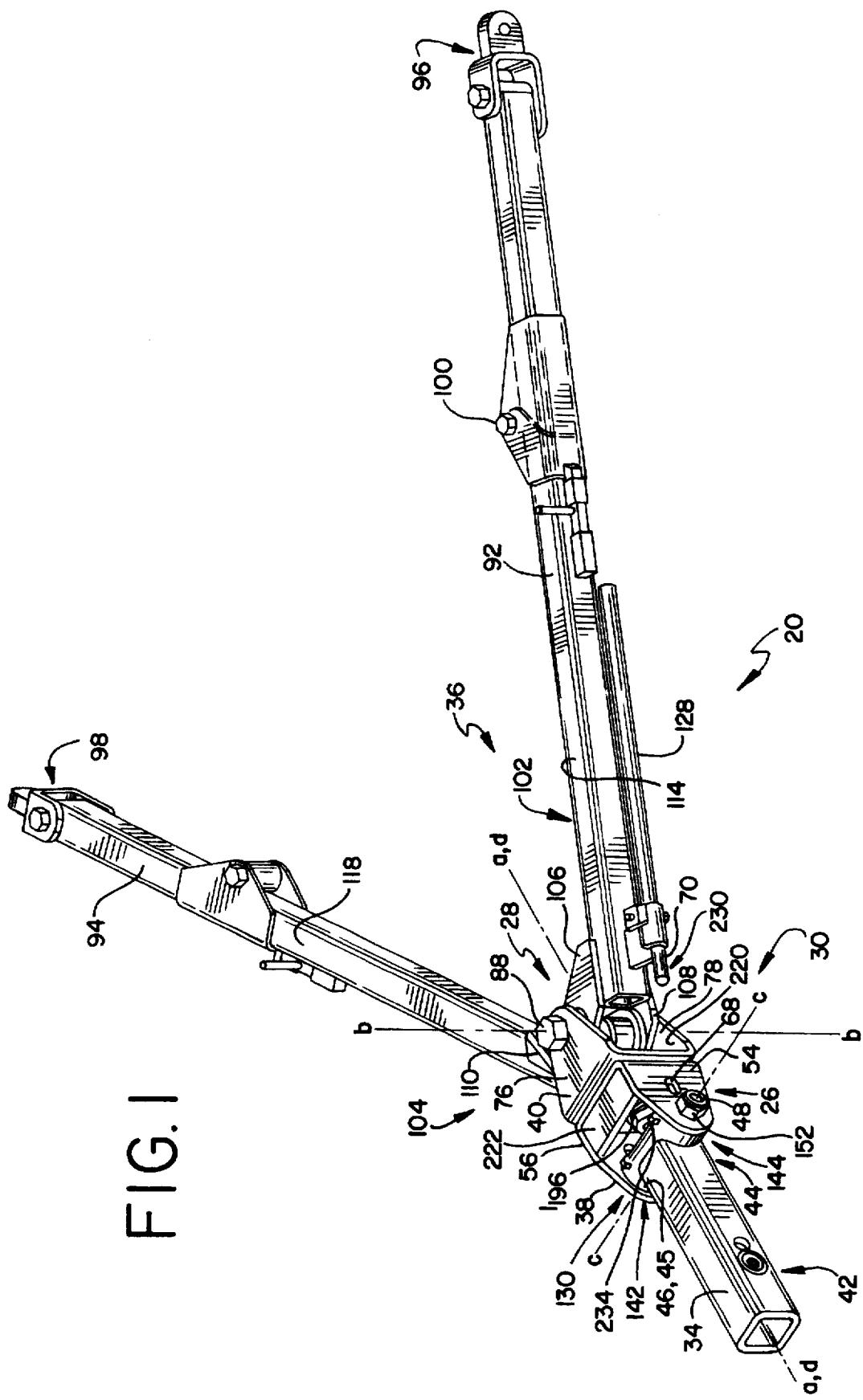
FIG. 1 is a perspective view of the self-aligning towing assembly of the present invention.

In FIG. 1, the preferred embodiment of the self-aligning towing assembly is shown prior to attachment to the towing vehicle 22 or to the towed vehicle 24. The hitching member 34 has a first end 42 suited for attachment to a towing vehicle 22, and a second end 44 opposite the first end. The hitching member 34 may be constructed in many different configurations to attach to a variety of vehicles. A sleeve member 45, which is an annular sleeve member 46 in the preferred embodiment, is integrated with the hitching member 34 at the second end 44 of the hitching member. The first yoke member 38 is pivotally attached to the hitching member 34 by a vertical pivot member 48. This vertical pivot member 48 allows the first yoke member 38 to pivot with respect to the hitching member 34 about a first axis c—c. While the shown preferred embodiment of the towing assembly is part of a tow bar assembly, it is contemplated that the self-aligning towing assembly 20 may be used as part of a variety of towing arrangements.

The first yoke member 38 is formed by a base plate 52 having a first 54 and a second 56 parallel leg plate extending from opposite edges of a first side 58 the base plate. The first 54 and second 56 parallel leg plates each have an aligned aperture 60, 62 respectively, which corresponds to the vertical pivot member 48 which runs through the annular sleeve member 46. The base plate of the first yoke member 38 has a centrally located aperture 64 to allow the base plate 52 to receive a swivel member 66. At least one of the parallel leg plates of the first yoke member 38 has an aperture 68 to allow insertion of a rod 70 which is used to latch the towed vehicle attachment means 36 in a storage position 72. The first yoke member 38 also has a support plate 222 extending normally from the first side of the base plate. This support plate 222 prevents the towed vehicle attachment means 36 from pivoting past the storage position 72.

The second yoke member 40 is formed by a base plate 74 having a first 76 and a second 78 parallel leg plate extending from opposite edges of a first side 80 of the base plate 74. The base plate 74 of the second yoke member 40 has a centrally located aperture 82 which corresponds with the centrally located aperture 64 in the base plate 52 of the first yoke member 38. The first parallel leg plate 76 has an aligned aperture 84 corresponding with a horizontal pivot member 88, which is a bolt in the preferred embodiment. The second parallel leg plate 78 has an aligned aperture 86 corresponding with the horizontal pivot member 88. This horizontal pivot member 88 pivotally attaches the towed vehicle attachment means 36 to the second yoke member 40. The towed vehicle attachment means 36 pivots with respect to the second yoke member 40 about a second axis b—b which is longitudinal and coaxial with respect to the horizontal pivot member 88.

In the preferred embodiment the towed vehicle attachment means 36 comprises a first towing arm 92 and a second towing arm 94. The first towing arm 92 has a first end 96 for releasable attachment to a towed vehicle 24. The second towing arm 94 has a first end 98 for releasable attachment to a towed vehicle 24. The towing arms may be constructed in many ways for attachment to a variety of vehicles. For example it is contemplated that each towing arm may be foldable about a pivotal joint midway 100 between the first end and second end of the arm so that the arm will store in a smaller space. Similarly it is contemplated that telescoping arms (not shown) may be used to accomplish the same purpose. The second end 102 of the first towing arm and the second end 104 of the second towing arm are pivotally attached to the second yoke member 40. The arms are attached through flanges fixed to the second ends 102, 104 of the towing arms. The first towing arm 92 has a first flange 106 affixed to the top surface 114 of the first towing arm when the self-aligning towing assembly 20 is in a towing position 116, and a second flange 108 affixed opposite and facing the first flange 106. The second towing arm 94 has a first flange 10 affixed to the top surface 118 of the towing arm when the self-aligning towing assembly is in a towing position 116, and a second flange 112 affixed opposite and facing the first flange 110. The first flange 106 on the first towing arm 92, the second flange 108 on the first towing arm 92, the first flange 110 on the second towing arm 94, and the second flange 112 on the second towing arm 94 each have a corresponding and aligned hole 120, 122, 124, 126 through which the horizontal pivot member 88 is received. As can be seen in the Figures, a dowel 128 may be attached to the towing arms. The dowel 128 can be used as a spool for storing any electrical wiring (not shown) that must run between a towing vehicle 22 and a towed vehicle 24.

An assembly view of the preferred embodiment can be seen in FIG. 11. The vertical pivot means 26 comprises a first passageway 130 through the second end 44 of the hitching member 34, the aligned aperture 60 in the first parallel leg plate 54 of the first yoke member 38, the aligned aperture 62 in the second parallel leg plate 56 of the first yoke member 38, and a vertical pivot member 48. In the preferred embodiment, the first passageway 130 is formed by the annular sleeve member 46 integrated with the second end 44 of the hitching member 34, a first vertical pivot bushing 132, and a second vertical pivot bushing 134. The first vertical pivot bushing 132 has a shoulder 136 which is of greater diameter than an inner diameter 148 of the annular sleeve member 46. The second vertical pivot bushing 134 has a shoulder 138 which is of greater diameter than the inner diameter 148 of the annular sleeve member 46. The first vertical pivot bushing 132 has a cylindrical body section 144 which is of such an outer diameter that it fits snuggly against the inner diameter 148 of the annular sleeve member 46. The second vertical pivot bushing 134 has a cylindrical body section 146 which is of such an outer diameter that it fits snuggly against the inner diameter 148 of the annular sleeve member 46. The first vertical pivot bushing 132 is situated so that its shoulder 136 is contacting the first end 140 of the annular sleeve member 46, and the cylindrical body section 144 of the first vertical pivot bushing 132 is extending into the annular sleeve member 46. The second vertical pivot bushing 134 is situated so that its shoulder 138 is contacting the second end 142 of the annular sleeve member 46, and the cylindrical body section 146 of the second vertical pivot bushing 134 is extending into the annular sleeve member 46. The vertical pivot bushings 132, 143 allow the swivel means 30 and the towed vehicle attachment means 36 to pivot about the first axis c—c on upon the application of a sufficient force normal to the first axis. However, the vertical pivot bushings 132, 134 fit snuggly enough into the annular sleeve member 46 to provide support against gravity pivoting the swivel means 30 and the towed vehicle attachment means 36 about the first axis c—c, and thereby make the self-aligning towing assembly 20 self-supporting. In the preferred embodiment, the vertical pivot member 48 is a bolt, having a threaded portion 150. A nut 152 is threaded on to the threaded portion 150 to hold the vertical pivot member 48 in place. The swivel means 30 and the towed vehicle attachment means 36 pivot as a unit about the first axis c—c which is coaxial and longitudinal with respect to the vertical pivot member 48.

In an alternative embodiment shown in FIG. 10, the first passageway 130 further comprises a tapered annular bearing 154 which engages the vertical pivot member 48 between the first 132 and second 134 vertical pivot bushings. The tapered annular bearing 154 has a constant inner diameter 156, and tapers from a maximum outer diameter at a central region 158 to a minimum outer diameter at a first end 160 and a second end 162. In this embodiment the first 132 and second 134 vertical pivot bushings have corresponding tapered inner diameters 164, 166 which contact the tapered outer diameters of the tapered annular bearing 154.

The swivel means 30 is formed by orienting the second yoke member 40 such that a second side 170 of its base plate 74 is proximate to and facing a second side 168 of the base plate 52 of the first yoke member 38. The swivel member 66 runs through the centrally located apertures 64, 82 in the base plate of each yoke member 38, 40. An aperture 68, about which the first yoke member 38 is free to rotate with respect to the second yoke member 40, is coaxial and longitudinal with respect to the swivel member 66. Friction controlling means 172 help reduce wear on the swivel means 30, allow for easier conversion of the towed vehicle attachment means into and out of the storage position 72, and allow the swivel means 30 to be self-supporting. By controlling the friction in the swivel means 30 so that there is enough friction to help prevent gravity from twisting the towed vehicle attachment means 36, but not so much friction that the self-aligning towing assembly 20 is difficult to convert between storage 72 and towing 116 positions, the friction controlling means 172 makes attachment of the towed vehicle attachment means 36 to the towed vehicle 24 easier. The preferred friction controlling means 172 are annular disks. These disks are self-lubricating and made of molydisulfide impregnated nylon, such as NYLATRON, or a similar material. A first self-lubricating annular disk 174 is located between the second side 168 of the base plate 52 of the first yoke member 38 and the second side 170 of the base plate 74 of the second yoke member 40, and a second self-lubricating annular disk 176 is located between the first side 58 of the base plate 52 of the first yoke member 38 and a thrust plate 178. It is contemplated that other friction controlling means could be substituted, for example ball bearings (not shown), or a heavy grease (not shown).

In the preferred embodiment the swivel member 66 is a swivel bolt 180, having a head end 182 and a threaded end 184, extended coaxially through the centrally located apertures 64, 82 in the base plate 52, 74 of each yoke member 38, 40. A nut 186 is threaded on the threaded end 184 and tightened until a clamping force is applied to the first and second yoke members 38, 40. Pre-stressing the swivel means 30 with a clamping force allows the second sides 168, 170 of base plates 52, 74 of the yoke members 38, 40 to remain in contact with the friction controlling means 172 when a towing load is applied to the self-aligning towing assembly 20 and thereby prevent play in the swivel means 30. Means for distributing 188 the clamping force across the first side 58, 80 of the base plates 52, 74 of the yoke members 38, 40 is present. This means for distributing 188 the clamping force includes a locking washer 190 and the thrust plate 178 for distributing the force across the first side 58 of the base plate 52 of the first yoke member 38, and a thrust block 192 for distributing the clamping force on the first side 80 of the base plate 74 of the second yoke member 40. The locking washer 190 engages the swivel bolt 180 between the nut 186 and the thrust plate 178, the thrust plate 178 engages the swivel bolt 180 between the locking washer 190 and the second self-lubricating annular disk 174. The thrust block 192 is attached to the first surface 80 of the base plate 74 of the second yoke member 40. The thrust block 192 engages the swivel bolt 180 between the swivel bolt's head 182 and the first side 80 of the base plate 74 of the second yoke member 40. While it is shown that the locking washer 190 and the thrust plate 178 are used to distribute the clamping force on the first side 58 of the base plate 52 of the first yoke member 38, and the thrust block 192 used to distribute the clamping force on the first side 80 of the base plate 74 of the second yoke member 40, it is contemplated and would be obvious to those skilled in the art to reverse the arrangement so that the thrust block 192 is attached to the first yoke member 38, and the locking washer 190 and the thrust plate 178 distribute the clamping force on the first side 80 of the base plate 74 of the second yoke member 40.

The horizontal pivot means 28 comprises the aligned aperture 84 in the first parallel leg plate 76 of the second yoke member 40, a horizontal pivot member 88, the aligned aperture 86 in the second parallel leg plate 78 of the second yoke member 40, a horizontal pivot member 88, and a second passageway 194. The horizontal pivot member 88 is bolt with a nut 196 attached to a threaded end 198 of the bolt. In the preferred embodiment, a portion of a shaft 200 of the horizontal pivot member 88 is covered by a self-lubricating sheath 202. This sheath may be made of molydisulfide impregnated nylon, such as NYLATRON, or a similar material. This self-lubricating sheath 202 controls friction in the horizontal pivot means 28. It is a replaceable wear surface. The second passageway 194 is formed by a first towing arm passageway 91 and a second towing arm passageway 93. The first towing arm passageway is form by the aligned apertures 120, 122, in the flanges 106, 108 attached to the first towing arm 92. The second towing arm passage is formed by the aligned apertures 124, 126 in the flanges 110, 112 attached to the second towing arm 94. In the preferred embodiment the self-aligning towing assembly further comprises means 203 for preventing play in the horizontal pivot means. These means are a first 204 and a second 206 horizontal pivot bushing. These horizontal pivot bushings 204, 206 engage the horizontal pivot member 88, and are located between the first flange 110 on the second towing arm 94 and the second flange 108 on the first towing arm 92. The horizontal pivot bushings 204, 206 prevent play in the horizontal pivot means 28. In the preferred embodiment, friction controlling means 208 are included. These friction controlling means 208 are third 210, fourth 212, fifth 214, and sixth 216 self-lubricating annular disks which receive the horizontal pivot means 28. These self-lubricating annular disks 210, 212, 214, & 216 are made of molydisulfide impregnated nylon or a similar material. The third self-lubricating annular disk 210 is placed between and in contact with an inner surface 218 of the first parallel leg plate 76 of the second yoke member 40 and the first flange 106 on the first towing arm 92. The fourth self-lubricating annular disk 212 is placed between and in contact with the first flange 106 on the first towing arm 92 and the first flange 110 on the second towing arm 94. The fifth self-lubricating annular disk 214 is placed between and in contact with the second flange 108 on the first towing arm 92 and the second flange 112 on the second towing arm 94. The sixth self-lubricating annular disk 216 is placed between and in contact with the second flange 112 on the second towing arm 94 and an inner surface 220 on the second parallel leg plate 78 of the second yoke member 40.

When the hitching member 34 is attached to a towing vehicle 22, and the towed vehicle attachment means 36 is attached to a towed vehicle 24 as shown in FIGS. 3, 4 the towed vehicle attachment means 36 is in a towing position 116. The towed vehicle attachment means 36 and the swivel means 30 are pivotal about the first axis c—c as a unit to a storage position 72 (see FIG. 6, towing vehicle not shown). To convert the towed vehicle attachment means 36 into the storage position 72, the towed vehicle attachment means 36 is first removed from the towed vehicle 24. The towed vehicle attachment means 36 and the swivel means 30 are pivoted about the first axis c—c upwards and towards the towing vehicle 22. The towed vehicle attachment means 36 and swivel means 30 are prevented from swinging past the storage position 72 by the support plate 222 on the first yoke member 38. The first towing arm 92 is pivoted about the second axis b—b until it is generally horizontal. The second towing arm 94 may be pivoted about the second axis b—b towards the first towing arm 92 until it rests on the first towing arm 92, this position being a side storage position 224 (see FIG. 6), or the second towing arm 94 may be pivoted away from the first towing arm 92 until the second towing arm 94 is generally horizontal as shown in FIG. 8, this position being a spread storage position 226 (see FIG. 8).

FIGS. 6A and 6B detail how the towed vehicle attachment means 36 may be secured in the storage position 72 by a latching mechanism 224. When the first towing arm 92 is in the storage position 72, the rod 70 attached to it is received in an aperture 68 in the first parallel leg plate of the first yoke member 38. The first end 230 of the rod 70 has a transverse bore 231 through it. When the rod 70 is seated in the aperture 68 in the first parallel leg plate 54, the first end 230 of the rod 70 extends into the first yoke member 38. A removable locking pin 232 which fits into the transverse bore 231 is placed through the transverse bore 231. This locking pin 232 is long enough to prevent the first end 230 of the rod 70 from being pulled back through the aperture 68 in the first parallel leg plate 54. The locking pin 232 in the preferred embodiment is curved on one leg so that it will hook on to the rod 70. By securing the rod 70 in the aperture 68 in the first parallel leg plate 54, the locking pin 232 prevents the first towing arm 92 from pivoting about the second axis b—b, and prevents the second yoke member 40 from rotating about the third axis designation a—a. The swivel means 30 and towed vehicle attachment means 36 are prevented from rotating away from the towing vehicle 22 about the first axis c—c by a detent 234 on the annular sleeve member 46 that engages the first end 230 of the rod 70 when the rod 70 is seated in the aperture 68 in the first parallel leg plate 54. While it is shown that the rod 70 is attached to the first towing arm 92, it is contemplated and would be obvious to one skilled in the art to place a similar rod 70 on the second towing arm 94 so that the towed vehicle attachment means 36 could be latched in a storage position 72 on either side of the swivel means 30.

From the side storage position, the towed vehicle attachment means 36 may be converted to a shipping position 236 by removing the hitching member 34 from the towing vehicle 22, disengaging the latching mechanism 224, and rotating the hitching member 34 about the third axis a—a until the hitching member 34 is in alignment with the first towing arm 92.

The foregoing description and drawings merely explain and illustrate the invention and the invention is not limited thereto, except insofar as the claims are so limited, and those skilled in the art who have the disclosure before them will be able to make modifications and variations therein without departing from the scope of the invention. By way of example, while the preferred embodiment shows that the towing arms 92, 94 will be pivotally attached to the second yoke member 40 on a single horizontal pivot member 88, it is contemplated that each towing arm could be attached to the second yoke member 40 on separate horizontal pivot members.

What is claimed is:

1. A self-aligning towing assembly which allows universal pivoting about three axes between a towing vehicle and a towed vehicle, and which folds for convenient storage on or off said towing vehicle, said self-aligning towing assembly comprising:

(a) a generally horizontal forwardly extending hitching member having a first end adapted for selectively lockable receipt within a receiver hitch on said towing vehicle and a second end opposite said first end;

(b) a towed vehicle attachment means for releasable attachment to said towed vehicle, said towed vehicle attachment means having a first end for attachment to a towed vehicle, and a second end opposite said first end, said towed vehicle attachment mean comprising first and second elongated towing arms;

(c) vertical pivot means for allowing changes in elevation of said towed vehicle relative to said towing vehicle, said vertical pivot means being attached to said second end of said hitching member;

(d) horizontal pivot means for allowing changes in lateral angular orientation of said towed vehicle relative to an extended longitudinal axis of said hitching member, said horizontal pivot means being attached to said second end of said towed vehicle attachment means; and (e) swivel means located between and in connection with said vertical pivot means and said horizontal pivot means, said swivel means allowing for roll of said towed vehicle relative to said towing vehicle about said extended longitudinal axis of said hitching member, said location of said swivel means between said horizontal pivot means and said vertical pivot means allowing said self-aligning towing assembly to fold upon itself for storage.

2. The invention according to claim 1, wherein said vertical pivot means comprises:

(a) a first passageway located at said second end of said hitching member, said first passageway oriented normally to said longitudinal axis of said hitching member;

(b) a first yoke member comprising a base plate, said base plate having a first side and a second side opposite said first side, said first yoke member further comprising two parallel leg plates extending from opposite edges of said first side of said base plate, each of said parallel leg plates having aligned apertures corresponding to said first passageway; and (c) a vertical pivot member located and attached within said first passageway and said aligned apertures of said parallel leg plates of said first yoke member allowing said first yoke member to pivot with respect to said hitching member about a first axis, said first axis extended longitudinally along said vertical pivot member.

3. The invention according to claim 2 wherein said horizontal pivot means comprises:

(a) a second passageway located at said second end of said towed vehicle attachment means, said second passageway oriented normally to said extended longitudinal axis of said hitching member;

(b) a second yoke member comprising a base plate, said base plate having a first side and a second side opposite said first side, said second yoke member further comprising two parallel leg plates extending from opposite edges of said first side of said base plate, each of said parallel leg plates having aligned apertures corresponding to said second passageway;

(c) a horizontal pivot member located and attached within said second passageway and said aligned apertures of said parallel leg plates of said second yoke member allowing said towed vehicle attachment means to pivot with respect to said second yoke member about a second axis, said second axis extended longitudinally along said horizontal pivot member.

4. The invention according to claim 3, wherein each of said towing arms has a first end for releasable attachment to said towed vehicle, and a second end opposite said first end, said first towing arm having a first towing arm passageway through said second end of said first towing arm, said second towing arm having a corresponding and aligned second towing arm passageway through said second end of said second towing arm, said first towing arm passageway and said second towing arm passageway forming said second passageway.

5. The invention according to claim 3, wherein said swivel means comprises:

(a) said first yoke member;

(b) said second yoke member, said second side of said base plate of said second yoke member facing and proximate to said second side of said base plate of said first yoke member;

(c) an aperture centrally located in said base plate of said first yoke member;

(d) an aperture centrally located in said base plate of said second yoke member, said aperture in said base plate of said second yoke member in corresponding alignment with said aperture in said base plate of said first yoke member; and (e) a swivel member which engages said aperture in said base plates of said first and second yoke members such that said first yoke member is free to rotate with respect to said second yoke member about a third axis, said third axis extending longitudinally along said swivel member.

6. The invention according to claim 5, wherein said swivel member is a threaded swivel bolt with nut attached, and said nut is capable of being tightened in order to pre-stress said swivel means.

7. The invention according to claim 5, wherein said towed vehicle attachment means and said swivel means are pivotal as a unit about said first axis from a towing position, wherein said towed vehicle attachment means and said swivel means are in a substantially horizontal plane along said extended axis of said hitching member, to a storage position wherein said towed vehicle attachment means and said swivel means are in a substantially vertical plane which is normal to said extended longitudinal axis of said hitching member.

8. The invention according to claim 7, wherein the self-aligning towing assembly is further suitable for conversion into a shipping position when said hitching member has been released from said towing vehicle, wherein said towing assembly and said swivel means are pivoted about said third axis into planar alignment with said hitching member.

9. The invention according to claim 7, wherein said self-aligning towing assembly further comprises a latching mechanism for securing said towed vehicle attachment means and said swivel means in said storage position, said latching mechanism comprising:

(a) a rod attached to said first towing arm, said rod having a first end through which a transverse bore is formed;

(b) an aperture in a first parallel leg plate of said first yoke member through which said first end of said rod is received when said towed vehicle attachment means is in said storage position;

(c) a locking pin for receipt in said transverse bore, said locking pin being longer than a diameter of said aperture in said first parallel leg plate of said first yoke member, said locking pin thereby preventing said first end of said rod from sliding through said aperture in said first parallel leg plate of said first yoke member when said locking pin is received in said transverse bore, said locking pin thereby preventing said towed vehicle attachment means from rotating about said second axis and said third axis;

(d) a detent on said second end of said hitching member which engages said first end of said rod when said first end of said rod is slid through said aperture in said first parallel leg plate of said first yoke member, said detent thereby preventing said towed vehicle attachment means and said swivel means from pivoting about said first axis away from said towing vehicle.

10. The invention according to claim 9, wherein said detent is located on a sleeve member integrated with said second end of said hitching member.

11. A self-aligning towing assembly which allows universal pivoting about three axes between a towing vehicle and a towed vehicle, and which folds for convenient storage on or off said towing vehicle, said self-aligning towing assembly comprising:

(a) a hitching member for releasable attachment to said towing vehicle, said hitching member having a first end for attachment to said towing vehicle and a second end opposite said first end;

(b) a towed vehicle attachment means for releasable attachment to said towed vehicle, said towed vehicle attachment means having a first end for attachment to a towed vehicle, and a second end opposite said first end, said towed vehicle attachment means comprising a first towing arm and a second towing arm;

(c) vertical pivot means for allowing changes in elevation of said towed vehicle relative to said towing vehicle, said vertical pivot means being attached to said second end of said hitching member;

(d) horizontal pivot means for allowing changes in lateral angular orientation of said towed vehicle relative to an extended longitudinal axis of said hitching member, said horizontal pivot means being attached to said second end of said towed vehicle attachment means; and (e) swivel means located between and in connection with said vertical pivot means and said horizontal pivot means, said swivel means allowing for roll of said towed vehicle relative to said towing vehicle about said extended longitudinal axis of said hitching member, said location of said swivel means allowing said self-aligning towing assembly to fold upon itself for storage, said swivel means comprising a first yoke member and a second yoke member, said first yoke member comprising a base plate having a first side and a second side, said first side of said base plate of said first yoke member having parallel legs extending from opposing edges, said second yoke member comprising a base plate having a first side and a second side, said first side of said base plate of said second yoke member having parallel legs extending from opposing edges, said second side of said base plate of second yoke member facing and proximate to said second side of said base plate of said first yoke member, said second yoke member being free to rotate with respect to said first yoke member about an axis perpendicular to said second side of said base plate of said second yoke member.

12. The invention according to claim 11, wherein said vertical pivot means comprises:

(a) a first passageway located at said second end of said hitching member, said first passageway oriented normally to said longitudinal axis of said hitching member;

(b) aligned apertures in said parallel leg plates of said first yoke member corresponding to said first passageway; and (c) a vertical pivot member located and attached within said first passageway and said aligned apertures of said parallel leg plates of said first yoke member, said first yoke member pivoting with respect to said hitching member about a first axis longitudinal and coaxial with said vertical pivot member.

13. The invention according to claim 12, wherein said first passageway comprises:

(a) an annular sleeve member integrated with second end of said hitching means, said annular sleeve member having a first end and a second end opposite said first end;

(b) a first vertical pivot bushing having a shoulder which is of greater diameter than an inner diameter of said annular sleeve member, and said first vertical pivot bushing having a cylindrical body section, said first vertical pivot bushing being oriented such that said shoulder of said first vertical pivot bushing contacts said first end of said annular sleeve member and said body of said first vertical pivot bushing extends into said annular sleeve member;

(c) a second vertical pivot bushing having a shoulder which is of greater diameter than said inner diameter of said annular sleeve member, and said second vertical pivot bushing having a cylindrical body section, said second vertical pivot bushing being oriented such that said shoulder of said second vertical pivot bushing contacts said second end of said annular sleeve member and said body of said second vertical pivot bushing extends into said annular sleeve member.

14. The invention according to claim 13, wherein said first passageway further comprises:

(a) a tapered annular bearing that has a first end and a second end and a center region located centrally between said first end and said second end of said tapered annular bearing, said annular bearing having a constant inner diameter, said tapered annular bearing having a maximum outer diameter at said center region, said tapered annular bearing tapering to a minimum outer diameter at said first end and at said second end;

(b) said first vertical pivot bushing having a tapering inner diameter which corresponds to and contacts said tapering outer diameter of said tapered annular bearing between said center region and said first end of said tapered annular bearing; and (c) said second vertical pivot bushing, said second vertical pivot bushing having a tapering inner diameter which corresponds to and contacts said tapering outer diameter of said tapered annular bearing between said center region and said second end of said tapered annular bearing.

15. The invention according to claim 11, wherein said horizontal pivot means comprises:
 (a) a second passageway formed through said second end of said towed vehicle attachment means;
 (b) aligned apertures in said parallel leg plates of said second yoke member corresponding to said second passageway; and
 (c) a horizontal pivot member located and attached within said second passageway and said aligned apertures of said parallel leg plates of said second yoke member, said horizontal pivot member allowing said towed vehicle attachment means to pivot with respect to said second hitching member about a second axis longitudinal and coaxial with respect to said horizontal pivot member.

16. The invention according to claim 15 further comprising means for preventing play in said horizontal pivot means, said means for preventing play in said horizontal pivot means comprising:
 (a) a first horizontal pivot bushing, said first horizontal pivot bushing engaging said horizontal pivot member and contacting said second end of said first towing arm; and
 (b) a second horizontal pivot bushing, said second horizontal pivot bushing engaging said horizontal pivot member and contacting said first horizontal bushing and contacting said second end of said second towing arm.

17. The invention according to claim 16 further comprising means for controlling friction in said horizontal pivot means, said means for controlling friction in said horizontal pivot means comprising:
 (a) at least one annular disk which engages the horizontal pivot member between adjacent surfaces along the horizontal pivot member; and
 (b) a sheath which covers a portion of said horizontal pivot member.

18. The invention according to claim 11 wherein said swivel means comprises:
 (a) said first yoke member;
 (b) said second yoke member with said second side of said base plate of said second yoke member facing and proximate to said second side of said base plate of said first yoke member;
 (c) an aperture centrally located in said base plate of said first yoke member;
 (d) an aperture centrally located in said base plate of said second yoke member, said aperture in said base plate of said second yoke member in corresponding alignment with said aperture in said base plate of said first yoke member; and
 (e) a swivel member which engages said apertures in said base plates of said first and second yoke members such that said first yoke member is free to rotate with respect to said second yoke member about a third axis, said third axis being longitudinal and coaxial with said swivel member, said swivel member applying a clamping force which tends to urge said second surface of said base plate of said first yoke member towards said second surface of said base plate of said second yoke member.

19. The invention according to claim 18, wherein said swivel means further comprises:
 (a) means for distributing said clamping force evenly across said first side of said base plate of said first yoke member and said first side of said base plate of said second yoke member; and
 (b) means for controlling friction in said swivel means.

20. The invention according to claim 19, wherein:
 (a) said swivel member comprises a swivel bolt having a first end and a second end;
 (b) said means for distributing said clamping force comprises a locking washer, a thrust plate, and a thrust block, said locking washer engaging said swivel bolt and located between said first end of said swivel bolt and said thrust plate, said thrust plate engaging said swivel bolt and located between said locking washer and said first side of said base plate of said first yoke member, said thrust block being affixed to said first side of said base plate of said second yoke member and engaging said second end of said swivel bolt;
 (c) said means for controlling friction comprises a first annular disk located between said thrust plate and said first side of said base plate of said first yoke member, and a second annular disk located between said second side of said base plate of said first yoke member and said second side of said base plate of said second yoke member.

21. The invention according to claim 15, wherein said towed vehicle attachment means and said swivel means are pivotal as a unit about said first axis to a storage position wherein said towed vehicle attachment means and said swivel means are in a substantially vertical plane which is normal to said extended longitudinal axis of said hitching member, said towed vehicle attachment means is prevented from pivoting past said storage position by a support plate extending from said first side of said base plate of said first yoke member which contacts said hitching member when the towing assembly is in said storage position, said self-aligning towing assembly further comprising a latching mechanism for securing said towed vehicle attachment means and said swivel means in said storage position.

22. The invention according to claim 21, wherein said latching mechanism comprises:
 (a) a rod attached to said first towing arm, said rod having a first end through which a transverse bore is formed;
 (b) an aperture in a first parallel leg plate of said first yoke member through which said first end of said rod is received when said first towing arm is pivoted about said second axis to a position where said first towing arm is generally horizontal, said second towing arm may be pivoted about said second axis until it rests on said first towing arm, or said second towing arm may be pivoted away from said first towing arm until said second towing arm is generally horizontal where it will be stopped and supported by said base plate of said second yoke member;
 (c) a locking pin for receipt in said transverse bore, said locking pin being longer than a diameter of said aperture in said first parallel leg plate of said first yoke member, said locking pin thereby preventing said first end of said rod from sliding through said aperture in said first parallel leg plate of said first yoke member when said locking pin is received in said transverse bore, said locking pin thereby preventing said towed vehicle attachment means from rotating about said third axis;
 (d) a detent on said second end of said hitching member which engages said first end of said rod when said first end of said rod is slid through said aperture in said first parallel leg plate of said first yoke member, said detent thereby preventing said towed vehicle attachment means from pivoting about said first axis away from said towing vehicle.

23. The invention according to claim 22, wherein the towed vehicle attachment means may be further converted into a shipping position wherein said hitching member has been released from said towing vehicle, and said towed vehicle attachment means and said swivel means are pivoted about said third axis into planar alignment with said hitching member.

24. A self-aligning towing assembly which allows universal pivoting about three axes between a towing vehicle and a towed vehicle, and which folds for convenient storage on or off said towing vehicle, said self-aligning towing assembly comprising:

(a) a generally horizontal forwardly extending hitching member having a first end adapted for selectively lockable receipt within a receiver hitch on said towing vehicle and a second end opposite said first end;

(b) a towed vehicle attachment means for releasable attachment to said towed vehicle, said towed vehicle attachment means having a first end for attachment to a towed vehicle, and a second end opposite said first end, said towed vehicle attachment means comprising first and second elongated towing arms;

(c) vertical pivot means for allowing changes in elevation of said towed vehicle relative to said towing vehicle, said vertical pivot means being attached to said second end of said hitching member;

(d) horizontal pivot means for allowing changes in lateral angular orientation of said towed vehicle relative to an extended longitudinal axis of said hitching means, said horizontal pivot means being attached to said second end of said towed vehicle attachment means; and (e) swivel means located between and in connection with said vertical pivot means and said horizontal pivot means, said swivel means allowing for roll of said towed vehicle relative to said towing vehicle about said extended longitudinal axis of said hitching member, said location of said swivel means between said horizontal pivot means and said vertical pivot means allowing said self-aligning towing assembly to fold upon itself for storage; and (f) means for retaining said self-aligning towing assembly in a storage position.

25. The invention according to claim 24, wherein said vertical pivot means comprises:

(a) a first passageway located at said second end of said hitching member, said first passageway oriented normally to said longitudinal axis of said hitching member;

(b) a first yoke member comprising a base plate, said base plate having a first side and a second side opposite said first side, said first yoke member further comprising two parallel leg plates extending from opposite edges of said first side of said base plate, each of said parallel leg plates having aligned apertures corresponding to said first passageway; and (c) a vertical pivot member located and attached within said first passageway and said aligned apertures of said parallel leg plates of said first yoke member allowing said first yoke member to pivot with respect to said hitching member about a first axis, said first axis extended longitudinally along said vertical pivot member.

26. The invention according to claim 25 wherein said horizontal pivot means comprises:

(a) a second passageway located at said second end of said towed vehicle attachment means, said second passageway oriented normally to said extended longitudinal axis of said hitching member;

(b) a second yoke member comprising a base plate, said base plate having a first side and a second side opposite said first side, said second yoke member further comprising two parallel leg plates extending from opposite edges of said first side of said base plate, each of said parallel leg plates having aligned apertures corresponding to said second passageway;

(c) a horizontal pivot member located and attached within said second passageway and said aligned apertures of said parallel leg plates of said second yoke member allowing said towed vehicle attachment means to pivot with respect to said second yoke member about a second axis, said second axis extended longitudinally along said horizontal pivot member.

27. The invention according to claim 26, wherein each of said towing arms has a first end for releasable attachment to said towed vehicle, and a second end opposite said first end, said first towing arm having a first towing arm passageway through said second end of said first towing arm, said second towing arm having a corresponding and aligned second towing arm passageway through said second end of said second towing arm, said first towing arm passageway and said second towing arm passageway forming said second passageway.

28. The invention according to claim 26, wherein said swivel means comprises:

(a) said first yoke member;

(b) said second yoke member, said second side of said base plate of said second yoke member facing and proximate to said second side of said base plate of said first yoke member;

(c) an aperture centrally located in said base plate of said first yoke member;

(d) an aperture centrally located in said base plate of said second yoke member, said aperture in said base plate of said second yoke member in corresponding alignment with said aperture in said base plate of said first yoke member; and (e) a swivel member which engages said apertures in said base plates of said first and second yoke members such that said first yoke member is free to rotate with respect to said second yoke member about a third axis, said third axis extending longitudinally along said swivel member.

29. The invention according to claim 28, wherein said swivel member is a threaded swivel bolt with nut attached, and said nut is capable of being tightened in order to pre-stress said swivel means.

30. The invention according to claim 28, wherein said towed vehicle attachment means and said swivel means are pivotal as a unit about said first axis from a towing position, wherein said towed vehicle attachment means and said swivel means are in a substantially horizontal plane along said extended axis of said hitching member, to said storage position wherein said towed vehicle attachment means and said swivel means are in a substantially vertical plane which is normal to said extended longitudinal axis of said hitching member.

31. The invention according to claim 30, wherein the self-aligning towing assembly is further suitable for conversion into a shipping position when said hitching member has been released from said towing vehicle, wherein said towing assembly and said swivel means are pivoted about said third axis into planar alignment with said hitching member.

32. The invention according to claim 30, wherein said self-aligning towing assembly further comprises a latching mechanism for securing said towed vehicle attachment means and said swivel means in said storage position, said latching mechanism comprising:

(a) a rod attached to said first towing arm, said rod having a first end through which a transverse bore is formed;

(b) an aperture in a first parallel leg plate of said first yoke member through which said first end of said rod is received when said towed vehicle attachment means is in said storage position;

(c) a locking pin for receipt in said transverse bore, said locking pin being longer than a diameter of said aperture in said first parallel leg plate of said first yoke member, said locking pin thereby preventing said first end of said rod from sliding through said aperture in said first parallel leg plate of said first yoke member when said locking pin is received in said transverse bore, said locking pin thereby preventing said towed vehicle attachment means from rotating about said second axis and said third axis;

(d) a detent on said second end of said hitching member which engages said first end of said rod when said first end of said rod is slid through said aperture in said first parallel leg plate of said first yoke member, said detent thereby preventing said towed vehicle attachment means and said swivel means from pivoting about said first axis away from said towing vehicle.

33. The invention according to claim 32, wherein said detent is located on a sleeve member integrated with said second end of said hitching member.

* * * * *